United States Patent
Thomas et al.

(10) Patent No.: US 10,376,791 B1
(45) Date of Patent: Aug. 13, 2019

(54) TIME LAG SYNCHRONIZED, SIMULTANEOUS GAMEPLAY OF TRIVIA CONTESTS

(71) Applicant: Nobel Trivia, LLC, Raleigh, NC (US)

(72) Inventors: Prem Thomas, Palm Harbor, FL (US); Nathan Lehoux, St. Petersburg, FL (US); Arun Umapathy, Long Island City, NY (US)

(73) Assignee: Nobel Trivia, LLC, Raleigh, NC (US)

( * ) Notice: Subject to any disclaimer, the term of this patent is extended or adjusted under 35 U.S.C. 154(b) by 101 days.

(21) Appl. No.: 15/792,143

(22) Filed: Oct. 24, 2017

Related U.S. Application Data

(60) Provisional application No. 62/411,803, filed on Oct. 24, 2016.

(51) Int. Cl.
*A63F 13/75* (2014.01)
*A63F 13/358* (2014.01)
*A63F 13/71* (2014.01)
*A63F 9/18* (2006.01)
*A63F 9/24* (2006.01)

(52) U.S. Cl.
CPC ............... *A63F 13/75* (2014.09); *A63F 9/18* (2013.01); *A63F 9/24* (2013.01); *A63F 13/358* (2014.09); *A63F 13/71* (2014.09); *A63F 2300/532* (2013.01); *A63F 2300/535* (2013.01); *A63F 2300/5533* (2013.01)

(58) Field of Classification Search
CPC .... A63F 9/18; A63F 9/24; A63F 13/71; A63F 13/75; A63F 13/358; A63F 2300/532; A63F 2300/35; A63F 2300/5533
See application file for complete search history.

(56) References Cited

U.S. PATENT DOCUMENTS

2012/0108327 A1* 5/2012 Tandon ................. H04L 67/125 463/29
2012/0178073 A1* 7/2012 Wasmund ................. A63F 9/18 434/362

* cited by examiner

*Primary Examiner* — Jason T Yen
(74) *Attorney, Agent, or Firm* — Smith & Hopen, P.A.; Paul Murty; Nilay J. Choksi

(57) ABSTRACT

A system and methodology for executing a trivia contest/tournament simultaneously to a plurality of electronic devices, while eliminating fraud associated with trivia contests by ensuring that every gameplay experience across multiple devices, regardless of location, is consistent. This is accomplished by onboarding an electronic device, receiving a current date and time of the underlying user in a predetermined set of parameters, generating a payload (start time of contest, questions, order of questions, duration of each question, termination time of contest, etc.) and transmitting it to the electronic device at a time before the start of the contest. The lag time between all electronic devices is calculated and accounted for, so that each device starts the contest at the same time. The trivia contest takes place and terminates, so that each player has the same experience. Their answers are encrypted and transmitted back to the system for recording and assessment.

3 Claims, 2 Drawing Sheets

Encrypted data containing gameplay information back to server

Encrypted data containing gameplay information back to server

TIME LAG SYNCHRONIZED, SIMULTANEOUS GAMEPLAY OF TRIVIA CONTESTS

CROSS-REFERENCE TO RELATED APPLICATIONS

This nonprovisional application is claims priority to U.S. Provisional Patent Application No. 62/411,803, entitled "Time Lag Synchronized, Simultaneous Gameplay of Trivia Contests", filed Oct. 24, 2016 by the same inventors, the entirety of which is incorporated herein by reference.

FIELD OF THE INVENTION

This invention relates, generally, to trivia contests. More specifically, it relates to trivia contests that occur synchronously across multiple geographic regions and time zones.

BRIEF SUMMARY OF THE INVENTION

The long-standing but heretofore unfulfilled need for improved electronic trivia contests is now met by a new, useful, and nonobvious invention.

In an embodiment, the current invention is a non-transitory computer readable storage media having computer-executable instructions, when executed by a processor, performing a method for executing a trivia contest simultaneously to a plurality of electronic devices, wherein the plurality of electronic devices includes an electronic device (e.g., smartphone) in one time zone and another electronic device (e.g., tablet) in another time zone. The system server receives an array of trivia questions, where the questions have a particular type, such as multiple choice, true-false, pop-up, multiple correct, fill-in, initial answer, short answer, essay, matching, ordering, and any combination thereof. The electronic devices are onboarded, as a result of users of the devices accessing the system server. A timestamp (date and time) of each user is received from the devices, and an option is displayed to correct the timestamp if the date and time do not conform to a set of predetermined parameters.

When the date and time conform to the predetermined parameters, the devices are associated with the system server, the users are associated with the trivia contest, and the current date and time of each user is recorded. At a predetermined time prior to the start of the trivia contest, a payload is generated for transmission to the electronic devices. The payload includes questions randomly selected from the array of trivia questions and packed and encrypted prior to transmission, the start time of the trivia contest, the termination time of the trivia contest, the number of questions to be administered, the correct answers to the questions, the incorrect answers to the questions, and the duration of display time for each of the questions. The payload provides instructions to the electronic devices with regards to how to initiate the trivia contest at the start time and how to control the users' experiences during gameplay of the trivia contest. It is noted that the electronic devices should be capable of decrypting and reading data transmitted thereto from the system server.

Lag times are calculated between the start time of the trivia contest and the current dates and times of the electronic devices. In certain situations, these lag times should be different and are implemented on the respective devices, so that both electronic devices have the identical start time. The trivia contest progresses by displaying the questions in a predetermined chronological order, and a single question is displayed on each device to each user for no more and no less than a predetermined display duration of that particular question. After the questions are administered in this manner so that every question is identically administered to each and every user, the trivia contest is terminated at the termination time. In this way, the users experience the trivia contest in the same exact way. User answers are then encrypted and transmitted to the system server for recording and assessment by the system processor in communication with the system server.

In a further scenario where a third electronic device is present by is offline at the start time of the trivia contest, any missed questions are skipped based on the current date and time of this electronic device. When online, the user thereof is positioned at a respective question according to the predetermined chronological order.

In another scenario when one of the electronic devices loses connectivity during iteration of the trivia contest, the trivia contest continues, and a data package is received from the device when it regains connectivity whether during or after the trivia contest. This data package includes data about questions answered when it had lost connectivity. In this way, the user of this device has the identical experience as if he/she had not lost connectivity.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The main problem associated with conventional trivia contests is that electronic tournament gameplay is currently ridden with fraud relating to simultaneous gameplay. It is an object of the current invention to solve this problem and mitigate these concerns. What is needed is a testing system designed to electronically deliver the same questions to players simultaneously regardless of geographic location or time zone, to eliminate cheating or unfair advantages. However, in view of the art considered as a whole at the time the present invention was made, it was not obvious to those of ordinary skill in the field of this invention how the shortcomings of the prior art could be overcome.

In an embodiment, the current invention is a testing system and methodology for electronically and simultaneously delivering identical trivia questions to players regardless of geographic location or time zone. It is a primary object of the current invention to eliminate cheating or unfair advantages associated with trivia contests.

Figure 1:
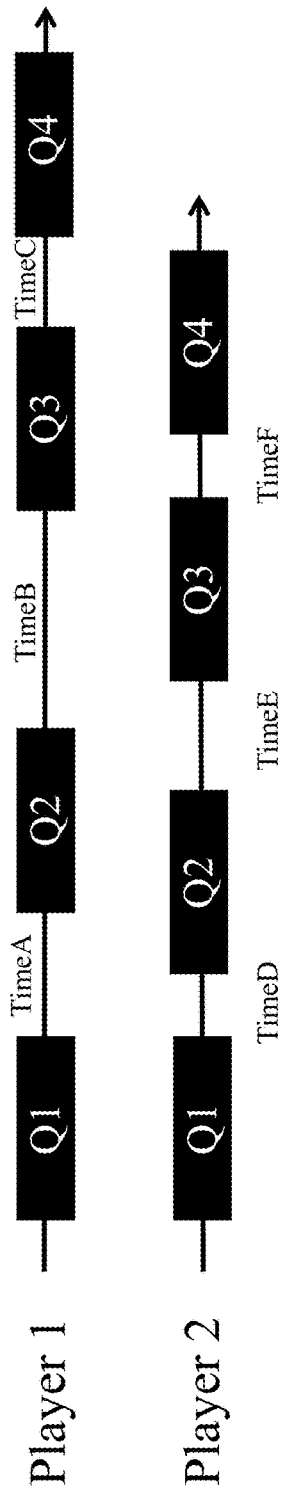
FIG. 1 is a timeline experienced by players in conventional trivia contests.
Figure 2:
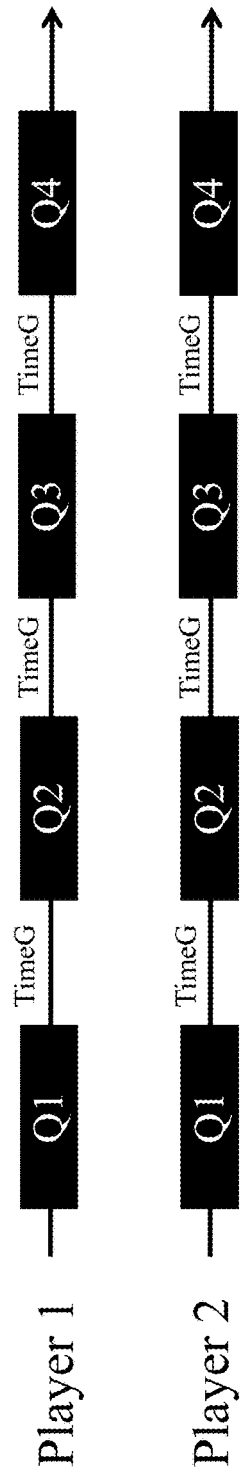
FIG. 2 is a timeline experienced by players in a trivia contest, according to an embodiment of the current invention.

This objective can be accomplished by conveying the same question to all players at the same time. All players then have the same predetermined amount of time to answer questions and cannot lengthen or shorten that amount of time (see FIG. 2, TimeG). For example, if a player completes a question prior to the predetermined amount of time elapsing, that player cannot move onto the next question (see FIG. 1, TimeD vs. TimeA) and must instead wait for the predetermined amount of time to elapse before progressing to the next question (see FIG. 2, TimeG). Along the same lines, players cannot return to a previous question to change answers. All players must begin and end each question simultaneously, along with beginning and ending the trivia contest as a whole simultaneously (see FIG. 2). Results from each question may or may not be given immediately after each question and/or at the end of the trivia contest.

Example

It is an object of the current invention to eliminate fraud in trivia contests and to ensure that every gameplay experience across multiple devices is consistent. To accomplish this, a stateless system is provided that allows for all gameplay to sync across multiple devices. This is implemented by removing most of the dependencies that are currently required for simultaneous gaming systems, such as constant internet connection, server uptime, etc.

Removing these dependencies—and providing the instant system and methodology—begins during onboarding of an end-user. Once a user is onboard with the system, certain information is collected from the user, most notably the user's current date and time. If the user or device does not follow the system's parameters for correct date and time, a request is transmitted to the user to correct the issue, and until the issue is resolved, the user is prevented from entering the trivia contest. Alternatively or in addition, the user's date and time can be retrieved from the user's device itself via its date-and-time module or can be confirmed by the device. Further, the user's location can be retrieved via user input or via an active location services module of the user's device. This location can also be used to retrieve or confirm the user's current date and time.

In any case, once the user's date and time has been received by the system/application and is within the acceptable preset parameters, the user is then permitted access to the trivia contest, and the current time of the user's device is recorded. This recorded time is used to calculate lag time relative to the server. It is then feasible to calculate start-time discrepancies between users. It is assumed herein that each device is not automatically synced with the same server (e.g., an APPLE server), due to users having different types of electronic devices and being located in different geographic regions. As such, all users' devices are synced with the current system's server.

As the start time of a trivia contest (tournament) approaches a predetermined/preset start time—to within X minutes of gameplay (where X is any positive number indicating number of minutes and seconds prior to initiation of a trivia contest)—the system will automatically generate questions for the upcoming game. These generated questions are packed and encrypted and sent to each subscribing user-operated device. Further, a payload is transmitted to each subscribing user-operated device, where the payload contains all pertinent details of the contest/tournament—for example including, but not limited to, start time, question duration, number of questions, correct answers, wrong answers, and metadata—to instruct said devices how to properly initiate a tournament at the preset start time and how to control tournament experience for the end-users. It is assumed that each device can decrypt and read data that is transmitted thereto from the system's server.

Figure 3:
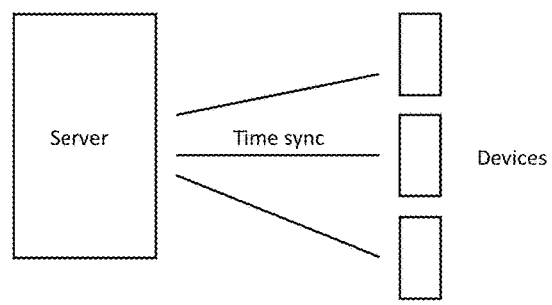
FIG. 3 is a flowchart depicting time synchronization between the server and individual players/devices, according to an embodiment of the current invention.

This payload is transmitted to each subscribing device, accounting for the proper time discrepancies between the time of the user being onboarded (i.e., when the user is accessing the application and is subscribed to a particular trivia contest) and the start time of that trivia contest, as previously discussed. Start-time discrepancies can then be determined by the system, such that the trivia contest can start simultaneously for each and every device. Each device is now synced to initiate at the same time the trivia contest or tournament to which it is subscribed (see FIG. 3). Each device then remotely initiates gameplay at the same exact second, regardless of type of device or location of the device. Gameplay will then proceed as previously discussed, specifically through the preset number of questions each being set in a single chronological order and having a preset time period for response by the user, until each user completes the contest/tournament at the same exact second. In this way, each user has an identical experience within a particular trivia contest/tournament.

An issue arises, for example, if a device is turned off or if the system application is closed out or is not running. In either case, the device initiates gameplay and gameplay will proceed when the user is onboarded; however, there is a significant discrepancy in that the user will be able to enter the tournament/contest only at a position of the current question that the system is displaying in the selected tournament. As such, the device will have automatically skipped each of the previous questions whose time limits have elapsed, and the user will receive a zero score for all of these missed questions. The device is configured to start the tournament at the appropriate question and time point, due to the payload that was previously transmitted to the device from the system at the predetermined time prior to the start of the tournament. Upon initiating the tournament at the appropriate question and time point, such that each "player" is still viewing the current question and future questions at the same time and for the same amount of time, each device will iterate through all questions according to the predetermined schedule.

Figure 4:
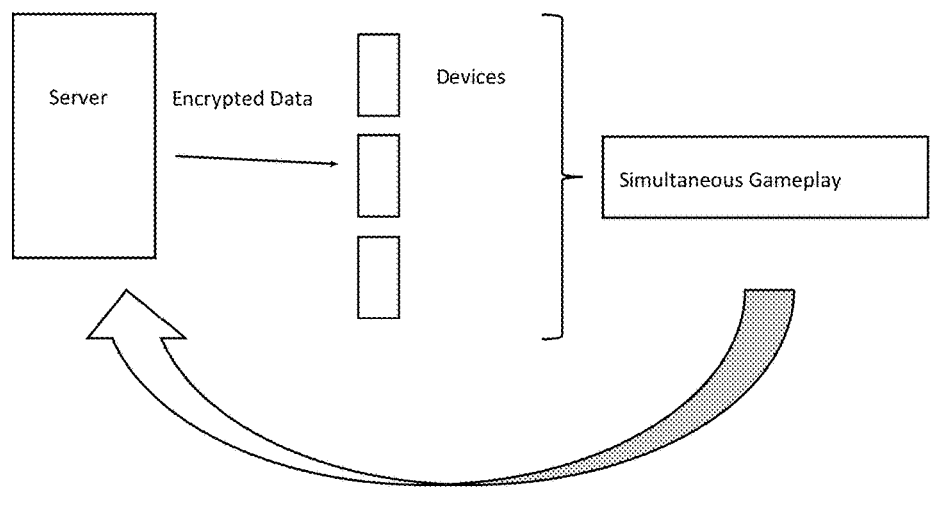
FIG. 4 is a flowchart depicting communication between the server and individual players/devices, according to an embodiment of the current invention.

After each contest/tournament or after each individual question therein, the device encrypts the answers to the questions, saves these encrypted answers, and transmits these saved encrypted answers to the system server for recording and assessment by the system processor. See FIG. 4.

If a device loses connectivity (e.g., cellular network, Wi-Fi, etc.) during this process (i.e., start of tournament, tournament itself, and post-tournament processing), gameplay will not be affected for the underlying user who lost connectivity with the device. Upon completion of gameplay, devices transmit back to the system a payload containing all data about questions answered, duration, speed, etc. This encrypted information is sent back to the system server for processing and ranking of the users amongst one another.

Using the current invention, any and all fraud in trivia contests is eliminated, as it can be ensured that every gameplay experience across multiple devices, regardless of location, is consistent.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A non-transitory computer readable storage media having computer-executable instructions, when executed by a processor, performing a method for executing a trivia contest simultaneously to a plurality of electronic devices, wherein said plurality of electronic devices includes a first electronic device in a first time zone and a second electronic device in a second time zone, the instructions comprising:

receiving to a system server an array of trivia questions having a type selected from the group consisting of multiple choice, true-false, pop-up, multiple correct, fill-in, initial answer, short answer, essay, matching, ordering, and any combination thereof;

onboarding said first and second electronic devices as a result of respective users of said first and second electronic devices accessing said system server;

receiving a date and time from each of said users or from said first and second electronic devices;

displaying an option to correct said date and time as a result of said date and time not conforming to a set of predetermined parameters;

associating said first and second devices with said system server and associating said each user with said trivia contest, as a result of said date and time being received in said predetermined parameters;

recording the current date and time of said each user;

at a predetermined time prior to a start time of said trivia contest, generating a payload for transmission to said first electronic device and to said second electronic device, wherein said payload includes a plurality of questions randomly selected from said array of trivia questions and packed and encrypted prior to transmission, said start time of said trivia contest, a termination time of said trivia contest, a number of said plurality of questions, correct answers to said plurality of questions, incorrect answers to said plurality of questions, and duration of display time for each of said plurality of questions, wherein said payload instructs said first and second electronic devices how to initiate said trivia contest at said start time and how to control said users' experience during gameplay of said trivia contest, whereby said first and second electronic devices are capable of decrypting and reading data transmitted thereto from said system server;

calculating and implemented a first lag time between said current date and time of said first electronic device and said start time of said trivia contest;

calculating and implemented a second lag time between said current date and time of said second electronic device and said start time of said trivia contest, wherein said first lag time and said second lag time are different from each other so that said first and second electronic devices launch said trivia contest at the same time;

iterating through said trivia contest by displaying said plurality of questions in a predetermined chronological order and displaying a single question to said users for no more and no less than a predetermined display duration of said single question;

terminating said trivia contest for said users at said predetermined termination time, whereby said users experience said trivia contest in the same manner;

encrypting answers provided by said users to said plurality of questions;

transmitting said encrypted answers to said system server for recording and assessment by a system processor in communication with said system server.

2. The non-transitory computer readable storage media as in claim 1, wherein as a result of a third electronic device that is subscribed to said trivia contest being offline at said start time of said trivia contest, skipping any missed questions based on said current date and time of said third electronic device, and positioning a user of said third electronic device at a respective question according to said predetermined chronological order.

3. The non-transitory computer readable storage media as in claim 1, wherein as a result of said first electronic device losing connectivity during iteration of said trivia contest, receiving a data package from said first electronic device when said first electronic device regains connectivity whether during or after said trivia contest, said data package including data about questions answered when said first electronic device had lost connectivity, whereby said first electronic device user's experience during said trivia contest is not affected when said first electronic device had lost connectivity.

* * * * *